(12) United States Patent
Handler

(10) Patent No.: US 6,756,544 B2
(45) Date of Patent: Jun. 29, 2004

(54) BRIDGE FOR INTERSECTING CABLE RACEWAYS

(75) Inventor: Jordan S. Handler, Stamford, CT (US)

(73) Assignee: Mono-Systems, Inc., Rye Brook, NY (US)

(*) Notice: Subject to any disclaimer, the term of this patent is extended or adjusted under 35 U.S.C. 154(b) by 0 days.

(21) Appl. No.: 10/418,516

(22) Filed: Apr. 17, 2003

(65) Prior Publication Data

US 2003/0207602 A1 Nov. 6, 2003

Related U.S. Application Data

(60) Provisional application No. 60/377,017, filed on May 1, 2002, and provisional application No. 60/381,815, filed on May 17, 2002.

(51) Int. Cl.[7] .................................................. H01B 3/00
(52) U.S. Cl. .................. 174/68.1; 174/68.3; 174/72 A; 174/72 C; 248/68.1
(58) Field of Search ............................ 174/68.1, 68.3, 174/72 A, 72 C, 95, 71.2, 48; 439/207; 248/68.1

(56) References Cited

U.S. PATENT DOCUMENTS 4,163,572 A * 8/1979 Benscoter ................ 285/284.1
5,942,724 A * 8/1999 Russo et al. .................. 174/48

* cited by examiner

*Primary Examiner*—Dhiru R Patel
(74) *Attorney, Agent, or Firm*—Ostrolenk, Faber, Gerb & Soffen, LLP

(57) ABSTRACT

A bridge to enable intersection of a first cable raceway and a second cable raceway. The first raceway has a first raceway section and a second raceway section joined by the bridge. The bridge includes a body shaped to communicate with the first and second raceway sections of the first raceway to define a continuous cable pathway from the first raceway section to the second raceway section. The body has a tunnel in its bottom side shaped to permit the second raceway to intersect the first raceway, whereby cables situated in the respective raceways may be prevented from touching.

27 Claims, 3 Drawing Sheets

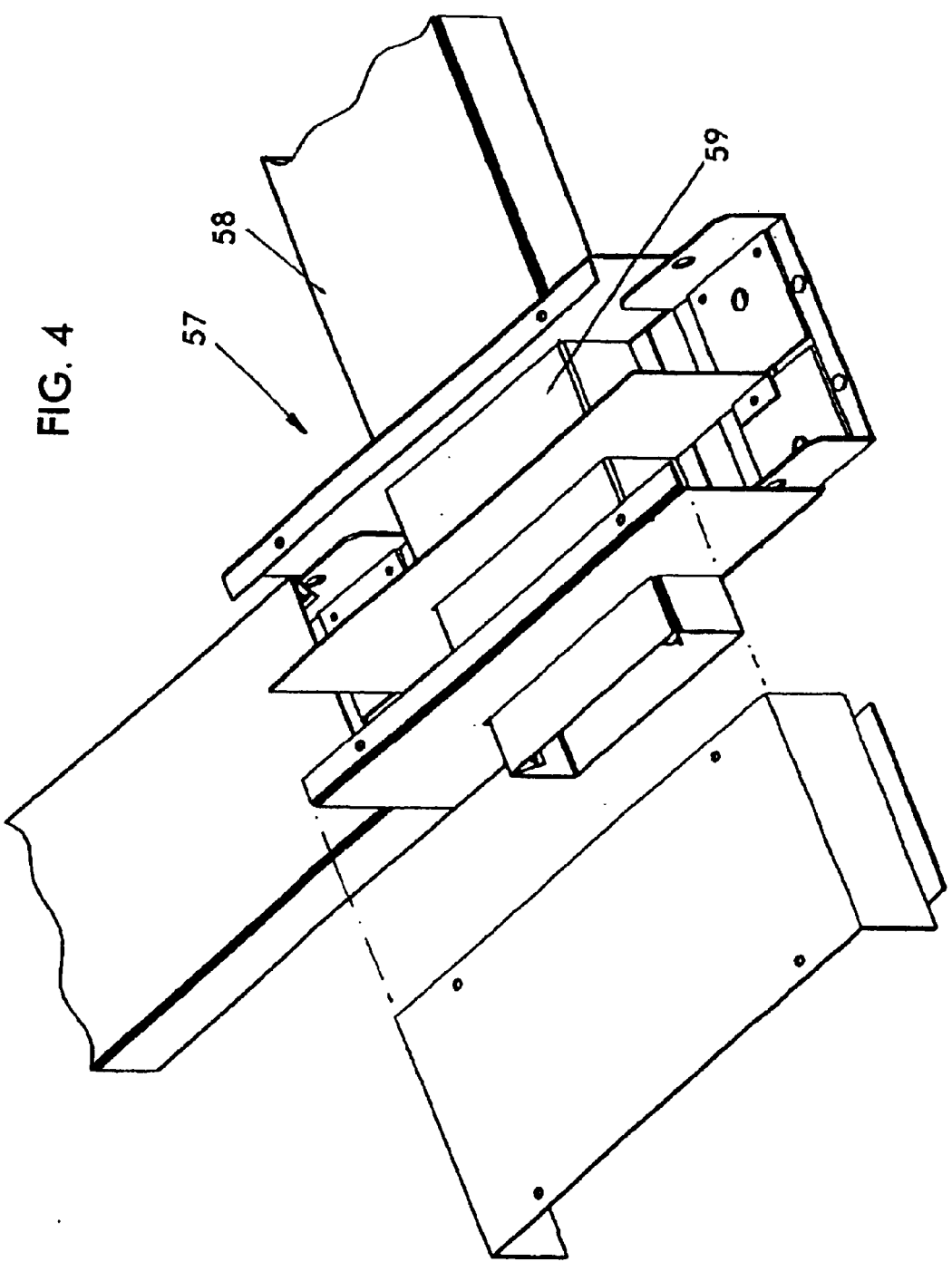

BRIDGE FOR INTERSECTING CABLE RACEWAYS

CROSS-REFERENCE TO RELATED APPLICATIONS

This application is based upon and claims benefit of U.S. Provisional Application Nos. 60/377,017, filed May 1, 2002 and 60/381,815, filed May 17, 2002, to which a claim of priority is hereby made.

FIELD OF THE INVENTION

The present invention relates to a bridge for intersecting cable raceways.

BACKGROUND OF THE INVENTION

Cables, such as data and electrical cables, fiber optic cables and/or wires may extend either along or behind a supporting surface, such as a wall or a ceiling. These cables may be supported and guided by a cable raceway.

An exemplary cable raceway assembly, includes a U-shaped tray having lateral sides that define a space for supporting cable therein. The tray may, for example, be affixed to a wall or ceiling. The open side of the tray may be closed by a cover.

In some situations, different runs of cables and/or wires may intersect along their normal paths. At least one of the conventional cable raceways may have to be interrupted where the cable raceways cross. Further, intersecting cables may cause electrical interference, wearing of cables, undesirable bends or stretches of cables, etc. and portions of the cables may be exposed and not properly supported in the vicinity of the interruption.

Also, a cable raceway may intersect and cross other objects at the wall or ceiling or in its path. These objects may include other conduits, pipes, radiator system pipes, shaping of the wall or ceiling, e.g. at a beam or support or any other object that would provide an obstacle to the continuous run of a continuous raceway or to the bottom or like attachment side of the raceway resting flush against the wall or ceiling adjacent the location where the raceway passes the obstacle. When confronted with an obstacle to a straight run of a raceway along a surface, contractors have bent a raceway in the field to wrap over or pass the obstacle. For unbendable raceway or as an alternative to bending, installers have built up the surface for the runway, e.g., by pieces of plywood or shims to raise the raceway at the intersection. Sometimes, the installers must reroute raceway to pass an obstacle.

SUMMARY OF THE INVENTION

It is an object of the present invention to provide a bridge to enable intersection of cable raceways.

Another object is to provide a raceway bridge design which is adaptable to pass any obstacle at the surface to which the raceway is supported.

The invention is described as an example here at the one raceway intersecting a second raceway. That is an example of one type of obstacle that a raceway run might encounter. In one form of the invention, one of the raceways is unchanged in character as it passes across the other raceway. The other second raceway includes a bridge at the intersection. The bridge is an intermediate piece disposed between the opposed, separated ends of two sections of the second raceway. The bridge has a cross-section shaped generally to the cross section of ends of the sections of the second raceway which it joins. Cables or wires run from one of those two raceway sections, through the correspondingly shaped bridge to the other of those two raceway sections, whereby the cables or wires are fully supported and do not contact the intersecting first raceway or the cables or wires supported in the intersecting first raceway or contact any other obstacle passed over by the bridge.

To permit the by passage of the intersecting first raceway, the other second raceway bridge has a shaped fixture. That permits the first raceway or other obstacle to pass by the second raceway. In a preferred form, the fixture of the second raceway comprises a tunnel with an open bottom defined on the bottom side of the bridge. The tunnel is shaped large enough so that the intersecting first raceway might pass through, yet small enough with reference to the remainder of the second raceway as to not prevent passage over the bridge of the cables extending between the two raceway sections joined by the bridge of the second raceway.

The height of the second raceway is selected related to the nature and quantity of the cables to be carried in that raceway. A higher profile raceway may be tall enough that the height of the bridge is the same height as the second raceway, while the first raceway or obstacle may easily pass through the tunnel of the second raceway. Where the first raceway or other obstacle is taller with respect to the second raceway having the bridge in it, in order that the second raceway be tall enough at the bridge to enable the tunnel of the second and the first raceway or obstacle passing through the tunnel to intersect while the bridge permits cable to extend in the second raceway, the bridge is profiled taller e.g. has a hump, over the first raceway or obstacle.

The bottom side of the second raceway and of the bridge therein typically is the side that is attached to the wall or the ceiling or other surface. If there were no fixture or tunnel, the intersecting first raceway or obstacle might push the second raceway up off the surface where the raceways cross. The fixture or tunnel is large enough, that is the top of the fixture or tunnel is high enough above the bottom of the bridge, so that the fixture or tunnel can receive the first intersecting raceway or obstacle and so that the bottom surface of the bridge and therefore of the associated raceway sections can remain against the supporting surface.

The top of the tunnel is preferably closed to prevent contact between the cables in the first raceway or the obstacle on the one hand and the second raceway on the other hand as they pass each other.

The open side of the raceway is closed by a cover adapted to be coupled to the body. The bridge body includes a bottom surface and at least two lateral sides. The lateral sides are configured to couple to the cover. The body may further include a divider arranged in the continuous cable pathway to separate cables extending over the bridge.

Other objects and features of the invention are described below with reference to the accompanying drawings.

BRIEF DESCRIPTION OF THE DRAWINGS

FIG. 4 illustrates in perspective a second embodiment of a bridge; and

DESCRIPTION OF A PREFERRED EMBODIMENT OF THE INVENTION

As mentioned above, the invention concerns intersection of a cable or wire raceway with another object at or adjacent the surface on which the raceway, and usually its bottom, are supported. In the examples here, the intersecting obstacle is illustrated as another cable raceway. Other obstacles may be bridged over as well.

Figure 1:
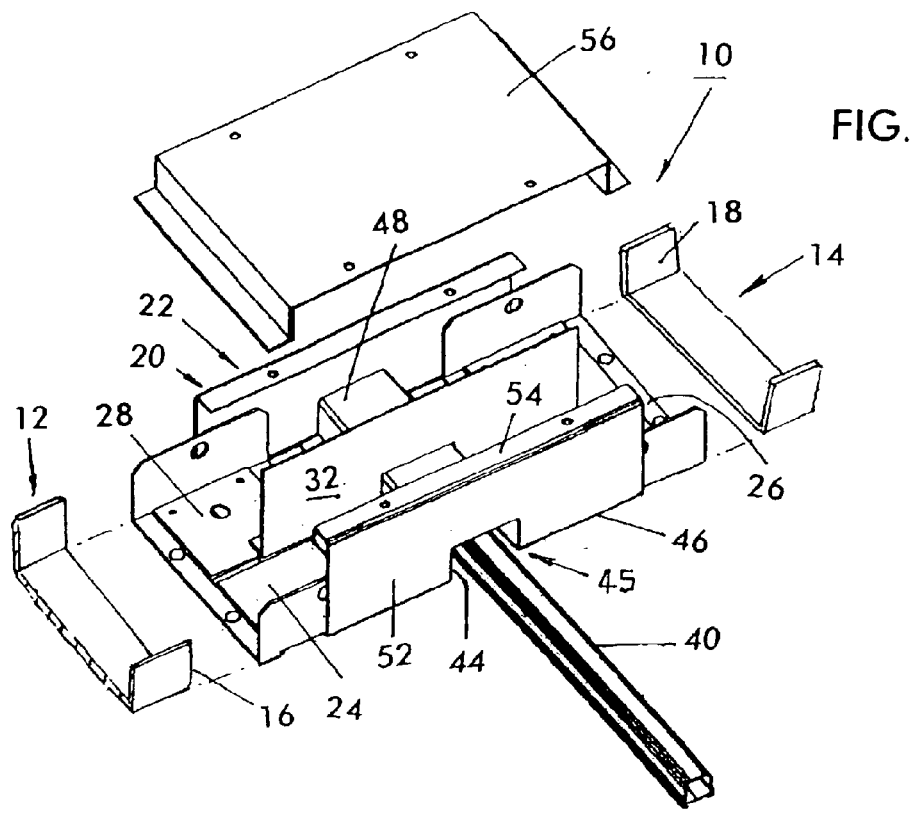
FIG. 1 illustrates in perspective a bridge between two raceway sections over a first intersecting raceway.

FIG. 1 shows a cable raceway assembly 10 according to the present invention. Assembly 10 includes a first raceway 11 having first and second raceway portions 12, 14, a second raceway 40, and a bridge 20 to permit the first raceway 11 to extend uninterrupted across the second raceway 40.

Figure 3:
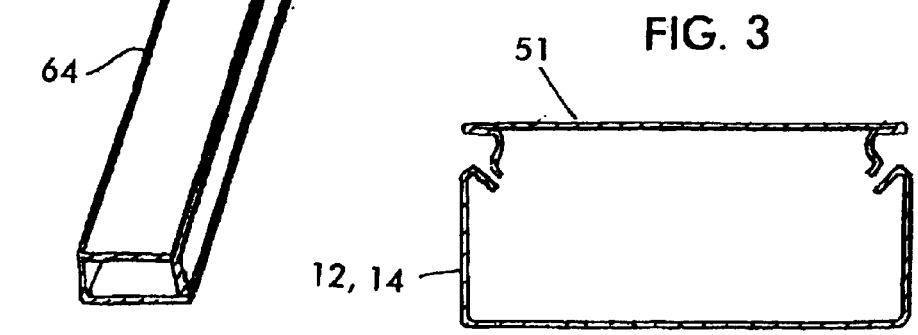
FIG. 3 is a cross section across a raceway section.

The first and second raceway portions 12, 14 of the first raceway 11 include respective opposed, facing end portions 16, 18, each having respective sidewalls and a floor portion. The top of the raceway sections 12, 14 may, for example, be closed by a cover 51, as shown in FIG. 3.

Figure 2:
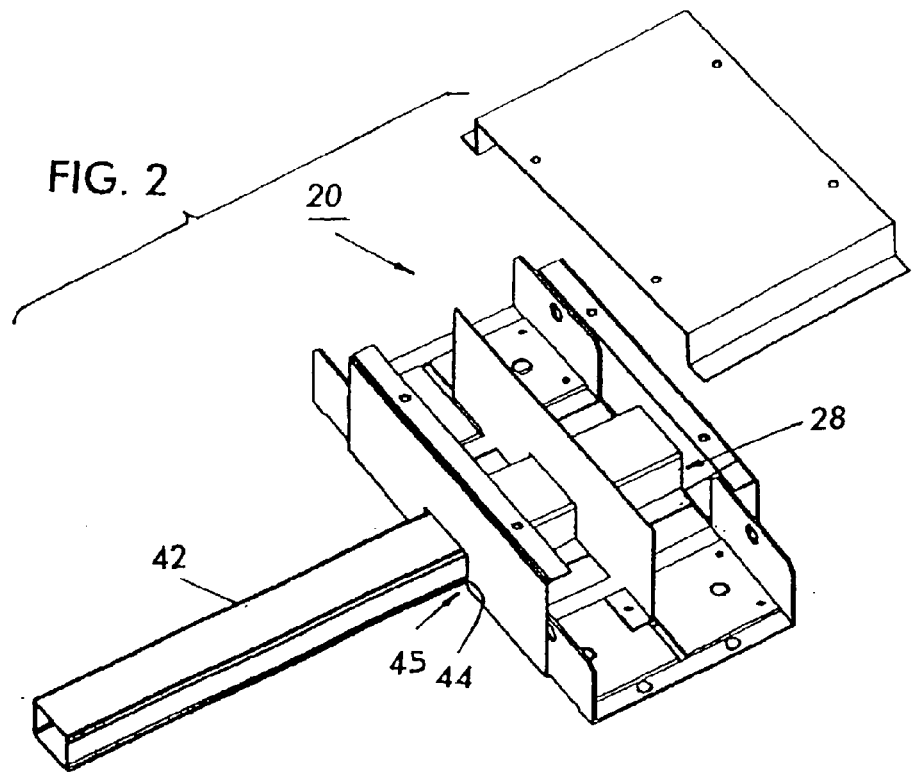
FIG. 2 is a view of the same raceway bridge from another direction and over a second intersecting raceway.

A bridge 20 includes a main body 22 and cable raceway installation tongues 24, 26 at its opposite ends. The tongues are shaped and sized to be fitted into the floor and sidewalls of the open ends 16 and 18 of the conventional cable raceway sections 12 and 14, respectively. Once installed in the raceway sections, the projecting tongues 24 and 26 may be fastened to the raceway sections 14, 16 through fastening holes to form a unitary raceway at the bridge 20, which raceway includes the sections 12 and 14 and the bridge 20. A continuous pathway for cable is defined along the raceway sections 12 and 14 and over the bridge pathway 28. The raceway sections 12 and 14 and the bridge 20 are of a sufficient cross-section to carry the required cables and of sufficient height that the bridge can carry the cables. In FIGS. 1 and 2 the sections 12 and 14 and the bridge 20 extend up to the same height.

Bridge 20 may also include a divider 32 longitudinally extending along the center of the bridge 20. The divider 32 may separate cables and/or wires extending over the bridge 20 and guides the cables and/or wires. The divider 32 may be permanently or detachably coupleable from the bridge 20, in accordance with a desired application and it may be field installable.

In order to accommodate a raceway 40 in FIG. 1 or 42 in FIG. 2 which are respectively of different sizes and cross sections, the bridge 20 has a fixture 44 defined at its underside 46. In particular, the fixture 44 comprises a tunnel 45 with an open bottom and of a size and cross section and a top of the tunnel at a height such that the entire raceway 40 or 42 can fit entirely within the dimensions of the tunnel 45. The cross sectional dimension of the tunnel 45 is selected so that it can accommodate various expected or standard sizes and cross-sections of cable raceway which may intersect the bridge 20. The cross section and particularly the depth of the tunnel 45 is selected so that with the intersecting raceway 40, 42 passing through it, the underside 46 of the bridge and along with it the underside of the adjacent raceway sections 12 and 14 can contact the surface to which the raceway is applied. Therefore the top of the tunnel is of such height and the tunnel is so shaped that the entire intersecting raceway is in the tunnel and it does no protrude below the bottom of the bridge.

Although FIG. 1 shows a fixture 44 having a notch-shaped tunnel 45, other shaped fixtures and/or tunnels may be provided to accommodate differently sized and shaped intersecting raceways. The tunnel 45 is enclosed over its top 48 so that cables or wires extending within the second raceway 40 are prevented from contacting cables and/or wires extending along the continuous cable pathway 28 of the bridge 20.

The bridge 20 includes upstanding sides 52 with inwardly projecting flanges 54 at the top ends of the sides. The flanges 54 may, for example, be appropriately sized to cooperate with a cover 56. For this purpose, the flanges 54, as well as the cover 56, may include attachment holes 57 to receive, for example, screws, nuts, bolts, etc., for fastening the cover 56 to the flanges 54 of the bridge 20.

The top of the raceway sections 12, 14 are typically closed by a cover 51, as seen in FIG. 3. Correspondingly, the bridge 20 has a cover 56 attached over the top of the bridge at the flanges 54 to enclose the cable within. The bridge may be of the same height as the raceway sections because the height of the tunnel is short enough that the tunnel top 48 does not block the cable passing over the bridge.

Although the raceway assembly shown in FIG. 1 includes a tunnel 45 sized to receive the second raceway 40, the cross section and dimensions of the tunnel 45 may be selected so that the bridge 20 can accommodate different sizes and cross-sections of cable raceways, for example, FIG. 2 shows another cable raceway assembly according to the present invention with a differently sized third raceway 42, but the same tunnel 45 that is configured to receive the raceway 42.

The second embodiment of FIG. 4 illustrates the same principles as FIGS. 1 and 2 with an assembly showing two intersecting raceways 58 and 61, and the bridge 57 having a tunnel sized to completely receive the raceway 58.

Figure 5:
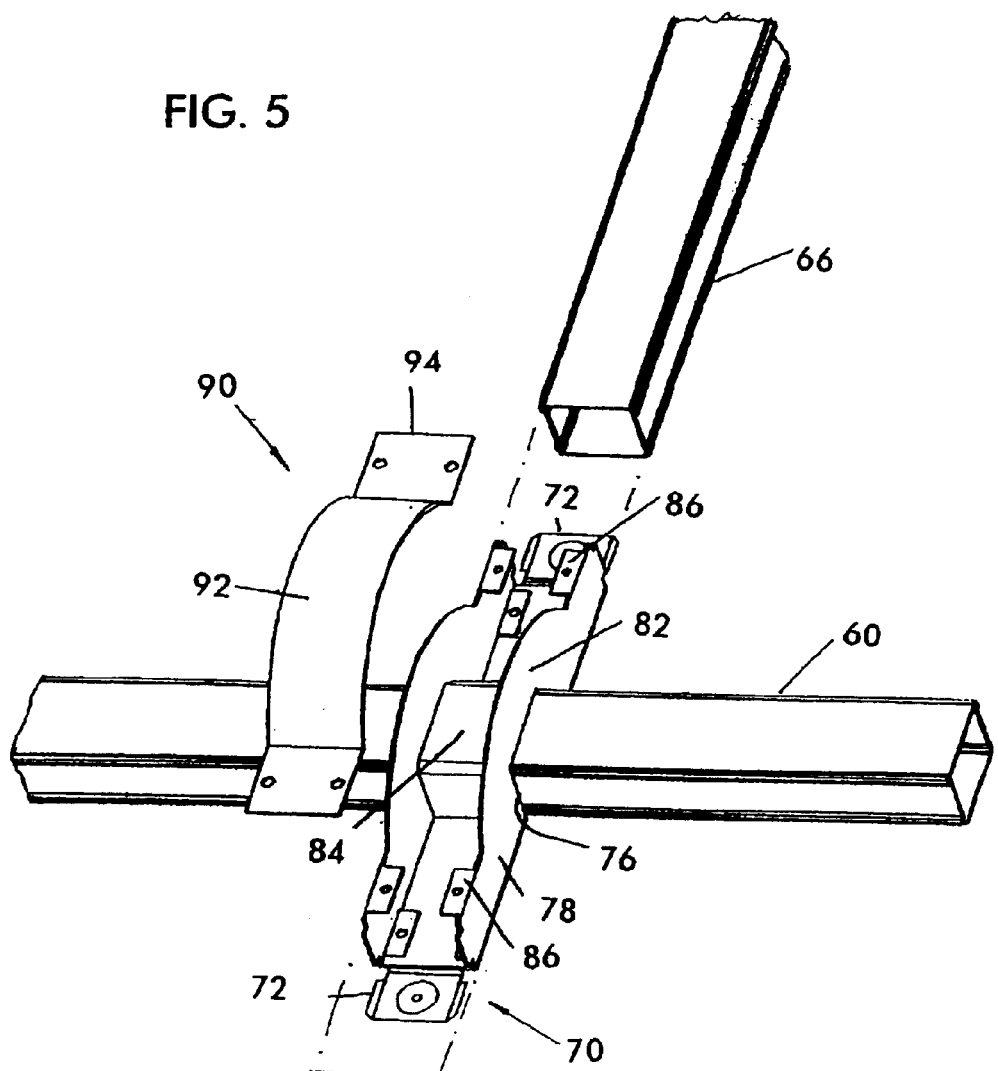
FIG. 5 illustrates in perspective a third embodiment of a bridge.

In the third embodiment of FIG. 5, the first raceway 60 is larger in cross section than either first raceway 40 or 42 of FIGS. 1 and 2 relative to the cross-section of the respective second raceway. As illustrated, raceways 60 and 62 have the same cross-section. The second raceway 62 includes sections 64 and 66 joined by bridge 70, which has end tongues 72 to be received in the ends of the sections 64, 66. Since raceway 60 would block passage of cable in raceway 62, the bridge 70 is taller at its part passing over the tunnel 76 and over the raceway 60 in the tunnel, giving the side walls 78 of the bridge 70 their upraised hump shape at 82. The top 84 of the tunnel 76 is above the bottom of the bridge and the top of the tunnel is closed in order to separate cables in the bridge from contacting the raceway 60 in the tunnel.

The second embodiment of raceway 60 lacks divider 32 shown in the first embodiment. The upstanding sides 78 of the bridge 70 include four inwardly projecting flanges 86 at their top ends. Bridge cover 90 has a top 92 curved in profile to match the profile of the upraised side walls 78 to close the raceway at the bridge. The cover includes two opposite outwardly projecting flanges 94 for attaching over the top of the bridge at flanges 86.

Other shaped fixtures and/or tunnels may be provided in the bridges 20 and 70 to accommodate differently sized and shaped intersecting raceways or other obstacles, within the concept of the invention. The configuration and cross section of the bridge would be adapted to the cross-sections of the intersecting raceways or other obstacles.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A bridge for enabling intersection of a cable and wire raceway with another object, comprising:

the bridge having a body with opposite ends shaped to cooperate with respective opposed ends of first and second raceway sections and the bridge is shaped to define a continuous cable or wire pathway from the first raceway section over the bridge to the second raceway section;

the first and second raceway sections and the bridge having a bottom side;

a fixture through the bridge oriented for receiving an intersecting obstacle extending across the bridge, so that the intersecting obstacle may intersect with the bridge while the bridge carries cable or wire between the first and second raceway sections without the cable or wire in the pathway at the bridge being blocked from passage in the cable or wire pathway by the intersecting obstacle, the fixture having a top which is above the bottom side of the bridge such that a top side of the intersecting obstacle is above the bottom side of the bridge.

2. The bridge of claim 1, wherein the fixture for receiving the intersecting obstacle comprises a tunnel defined at and extending above the bottom side of the bridge.

3. The bridge of claim 2, wherein the top of the fixture comprises a top side of the tunnel which is closed toward the cable or wire pathway of the bridge to not permit contact between the cable or wire in the cable pathway and in the intersecting obstacle.

4. The bridge of claim 3, wherein the tunnel has a bottom which is open permitting the bridge to be placed over the intersecting obstacle in the tunnel.

5. The bridge of claim 2, wherein the tunnel is of such size and such cross section and the top of the tunnel is of such height relative to the intersecting obstacle that with the intersecting obstacle that with the intersecting in the tunnel, the intersecting obstacle does not protrude out of the bottom side of bridge at the tunnel.

6. The bridge of claim 5, wherein the intersecting obstacle is of such a height and the tunnel has such a height that the first and second raceway sections and the bridge have a top at generally the same height without the tunnel interfering with cables or wires passing through the cable pathway on the bridge.

7. The bridge of claim 5, wherein the first and second raceway sections and the bridge each have a top, wherein the height of the bridge and the top thereof are selected so that the tunnel does not interfere with cables or wires passing through the cable pathway on the bridge.

8. The bridge of claim 7, wherein the height of the tunnel is tall enough that the bridge height over the tunnel is higher than the height of the first and second raceway sections.

9. The bridge of claim 5, wherein the tunnel has a bottom which is open permitting the bridge to be placed over the intersecting obstacle in the tunnel.

10. The bridge of claim 5, wherein the bottom sides of the first and second raceway sections and of the bridge are at the same height enabling their positioning against a surface.

11. The bridge of claim 1, further comprising first and second connecting arrangements at opposite ends of the bridge shaped and adapted to cooperate with the opposed ends of the first and second raceway sections for fastening the bridge to the first and second raceway sections.

12. The bridge of claim 1, wherein the tunnel including a top side of the tunnel extends up from the bottom side of the bridge, and the bridge has lateral sides upstanding from the bottom.

13. The bridge of claim 12, further comprising a cover over the bridge and joining the lateral sides for closing the cable or wire pathway along the bridge.

14. The bridge of claim 12, wherein the tunnel has a bottom which is open permitting the bridge to be placed over the intersecting obstacle in the tunnel.

15. The bridge of claim 1, wherein the bottom sides of the first and second raceway sections and of the bridge are at the same height enabling their positioning against a surface.

16. In combination, the bridge of claim 2, wherein the first raceway section is shaped and positioned for receiving and cooperating with the first end of the bridge and the second raceway section is shaped and positioned for cooperating with the second end of the bridge;

the obstacle comprising an intersecting cable or wire raceway intersecting the bridge and passing across the bridge through the tunnel.

17. The combination of claim 16, wherein the tunnel is of such size and cross section relative to the intersecting raceway that with the intersecting raceway in the tunnel, the intersecting raceway does not protrude out of bottom side of the bridge at the tunnel.

18. The combination of claim 17, wherein the tunnel has a bottom which is open permitting the bridge to be placed over the intersecting obstacle in the tunnel.

19. The combination of claim 16, further comprising first and second connecting arrangements at opposite ends of the bridge shaped and adapted to cooperate with the opposed ends of the first and second raceway sections for fastening the bridge to the first and second raceway sections.

20. The combination of claim 16, wherein the intersecting raceway is of such a height and the tunnel has such a height that the first and second raceway sections and the bridge have a top at generally the same height without the tunnel interfering with cables or wires passing through the cable pathway on the bridge.

21. The combination of claim 16, wherein the first and second raceway sections and the bridge each have a top, wherein the height of the bridge and the top thereof are selected so that the tunnel does not interfere with cables or wires passing through the cable pathway on the bridge.

22. The combination of claim 21, wherein the height of the tunnel is tall enough that the bridge height over the tunnel is higher than the height of the first and second raceway sections.

23. The combination of claim 16, wherein the tunnel has a bottom which is open permitting the bridge to be placed over the intersecting obstacle in the tunnel.

24. The combination of claim 16, wherein the bottom sides of the first and second raceway sections and of the bridge are at the same height enabling their positioning against a surface.

25. A cable raceway assembly, comprising:

a first cable raceway and a second cable raceway, the first raceway having a first raceway section and a second raceway section; and a bridge to enable intersection of the first and second cable raceways, the bridge including a body shaped to communicate with the first and second raceway sections of the first raceway, to define a continuous cable pathway from the first raceway section to the second raceway section; the body being shaped to permit the second raceway to intersect the continuous cable pathway, while enabling cables situated in the first and second respective raceways to be prevented from touching each other;

the body has a bottom side and a tunnel at the bottom side ot the body and the tunnel extending up from the bottom side, the tunnel being shaped to receive the second raceway, the second receway extending through the tunnel, the tunnel permitting the second raceway to intersect the continuous cable patheway without cables in the first and second raceways touching each other.

26. The cable raceway assembly of claim 25, further comprising a divider arranged in the continuous cable pathway, the divider being configured to separate cables extending through the continuous cable pathway.

27. The cable raceway assembly of claim 25, wherein the bottom sides of the first and second raceway sections and of the bridge are at the same height enabling their positioning against a surface.

* * * * *

(12) EX PARTE REEXAMINATION CERTIFICATE (6444th)
United States Patent
Handler

(10) Number: US 6,756,544 C1
(45) Certificate Issued: Sep. 16, 2008

(54) BRIDGE FOR INTERSECTING CABLE RACEWAYS

(75) Inventor: Jordan S. Handler, Stamford, CT (US)

(73) Assignee: Mono-Systems, Inc., Rye Brook, NY (US)

Reexamination Request:
No. 90/008,120, Jul. 25, 2006

Reexamination Certificate for:
Patent No.: 6,756,544
Issued: Jun. 29, 2004
Appl. No.: 10/418,516
Filed: Apr. 17, 2003

Related U.S. Application Data

(60) Provisional application No. 60/377,017, filed on May 1, 2002, and provisional application No. 60/381,815, filed on May 17, 2002.

(51) Int. Cl.
*H02G 3/08* (2006.01)
*H02G 3/04* (2006.01)
*H02G 3/10* (2006.01)

(52) U.S. Cl. .............. 174/68.1; 174/68.3; 174/72 A; 174/72 C; 248/68.1

(58) Field of Classification Search .............. 174/68.1, 174/68.3
See application file for complete search history.

(56) References Cited

U.S. PATENT DOCUMENTS

| | | | |
|---|---|---|---|
| 4,163,572 A | 8/1979 | Benscoter |
| 4,194,332 A | 3/1980 | Fork |
| 4,366,341 A | 12/1982 | Van Riet |
| 5,942,724 A | 8/1999 | Russo et al. |

*Primary Examiner*—Sam Rimell

(57) ABSTRACT

A bridge to enable intersection of a first cable raceway and a second cable raceway. The first raceway has a first raceway section and a second raceway section joined by the bridge. The bridge includes a body shaped to communicate with the first and second raceway sections of the first raceway to define a continuous cable pathway from the first raceway section to the second raceway section. The body has a tunnel in its bottom side shaped to permit the second raceway to intersect the first raceway, whereby cables situated in the respective raceways may be prevented from touching.

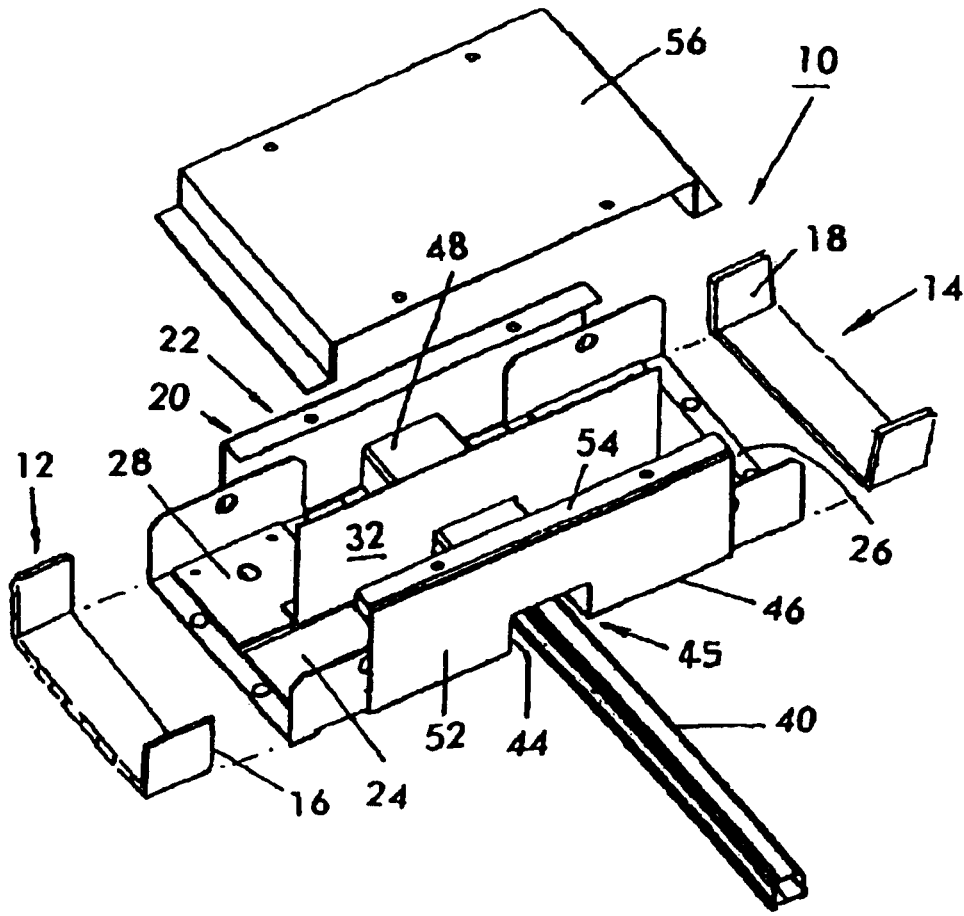

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–27 are cancelled.

\* \* \* \* \*